No. 646,813. Patented Apr. 3, 1900.
C. F. C. EDHOLM.
COUPLING DEVICE.
(Application filed Nov. 21, 1899.)
(No Model.) 2 Sheets—Sheet 2.
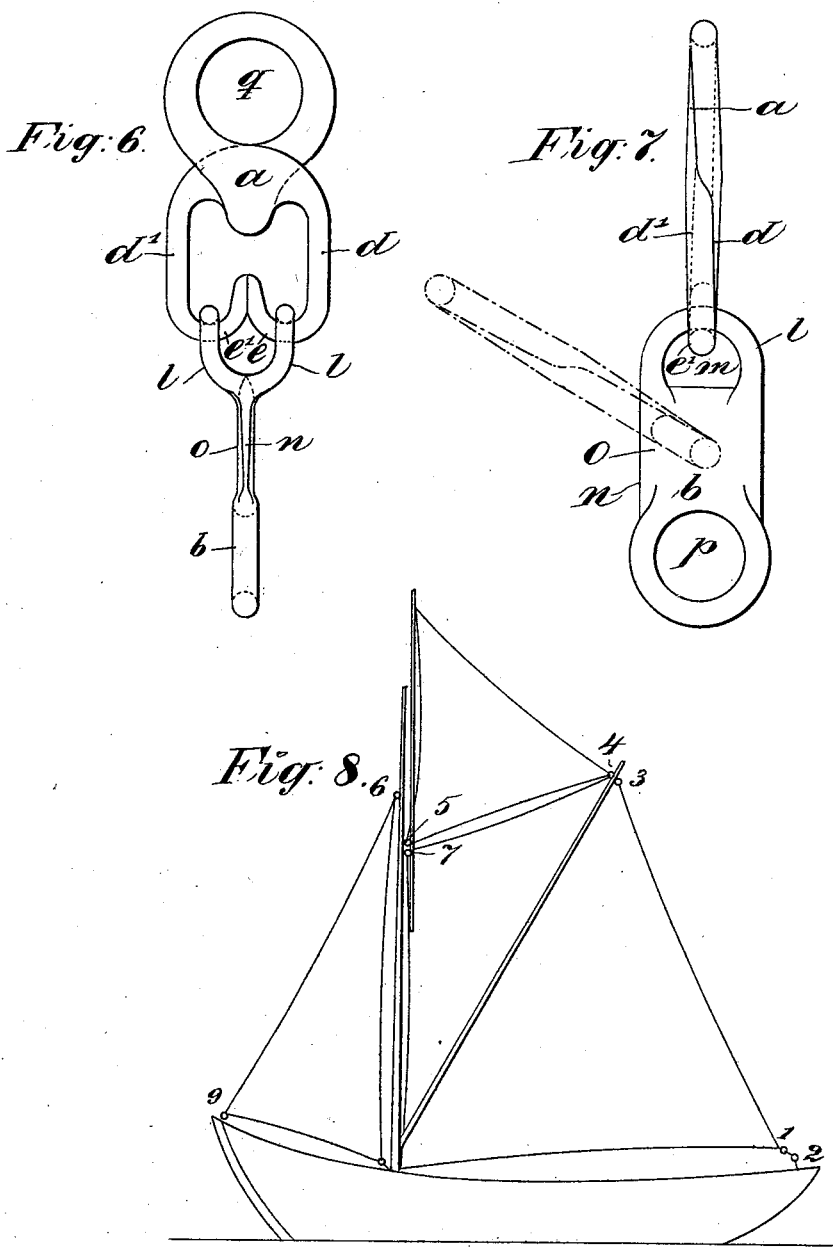
WITNESSES:
INVENTOR
Carl F. C. Edholm
BY
ATTORNEY

UNITED STATES PATENT OFFICE.

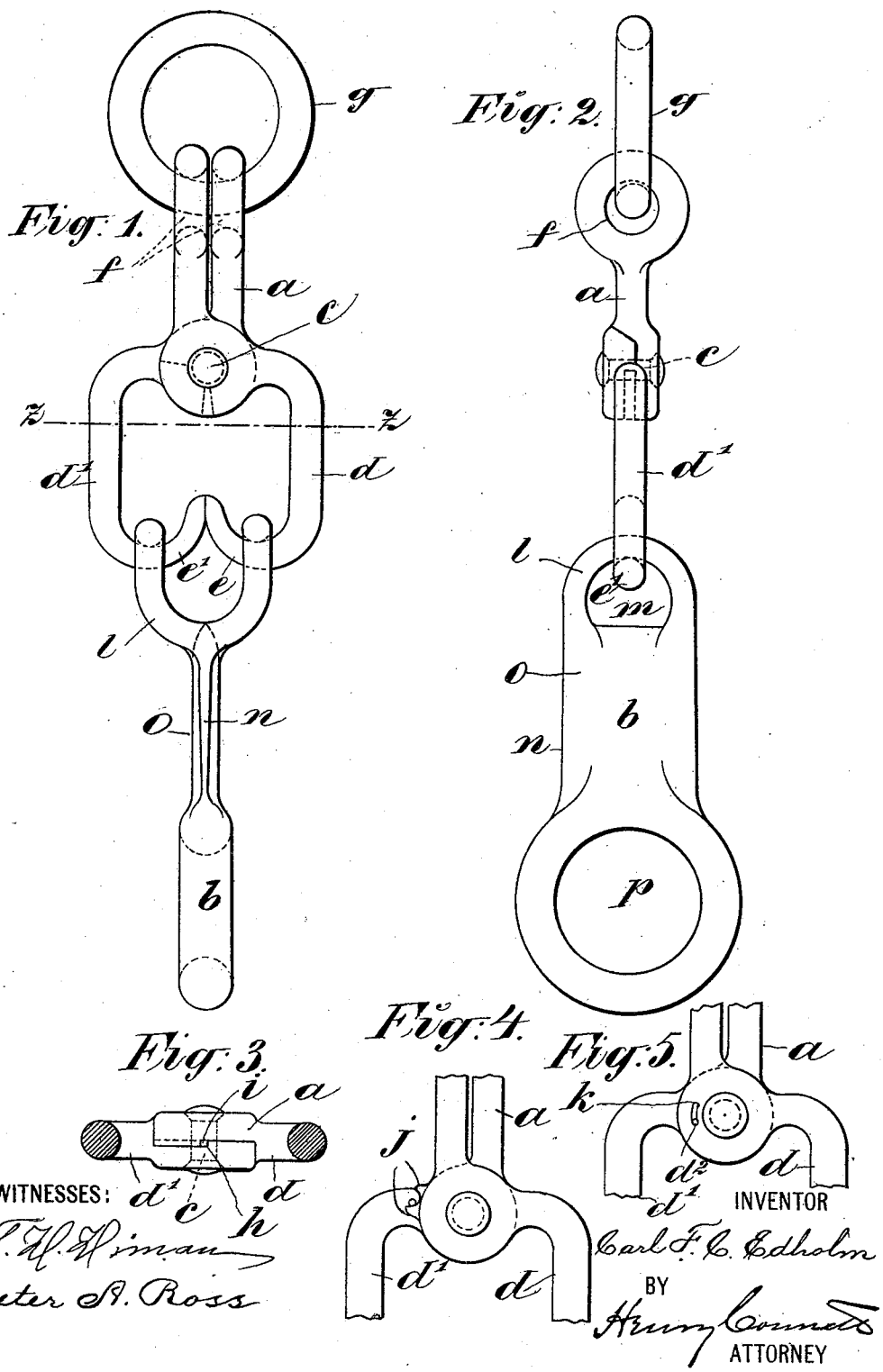

CARL FREDRIK CYRILLUS EDHOLM, OF WESTERVIK, SWEDEN.

COUPLING DEVICE.

SPECIFICATION forming part of Letters Patent No. 646,813, dated April 3, 1900.

Application filed November 21, 1899. Serial No. 737,757. (No model.)

*To all whom it may concern:*

Be it known that I, CARL FREDRIK CYRILLUS EDHOLM, a subject of the King of Sweden and Norway, and a resident of Westervik, Sweden, have invented certain new and useful Improvements in Coupling Devices, of which the following is a specification.

This invention relates to coupling devices such as are employed for connecting ropes and the like to each other or to other parts, and especially such as are employed in the rigging of sail-boats and other vessels.

The object of the invention is to provide a strong and simple coupling device, one in which the engagement of the two coupling elements may be readily effected even under disadvantageous circumstances and by unskilled hands and as readily disengaged, and one which shall not be liable to become accidentally uncoupled or disengaged.

In the accompanying drawings, which illustrate embodiments of the invention, Figure 1 is a face view, and Fig. 2 a side view, of the coupling device. Fig. 3 is a cross-section at line $z\,z$ in Fig. 1 and looking upward. Figs. 4 and 5 are fragmentary views illustrating two modified forms of the limiting-stop. Figs. 6 and 7 are views corresponding to Figs. 1 and 2, but illustrating a form of the coupling differing slightly from that shown in the principal views. Fig. 8 is a view showing the points in the rigging of a sloop or sail-boat where this coupling device may be used to advantage.

The coupling device, as illustrated in Figs. 1 and 2, comprises two elements. One element, $a$, is composed of two similar members $d$ and $d'$, pivotally connected at $c$ and provided, respectively, with inwardly-turned hooks $e\,e'$ and with eyes $f$ to receive a ring $g$. The hooks $e\,e'$ meet face to face, as shown in Fig. 1, and a strain or pull applied to the ring $g$ tends to press them together. The movements of the members $d\,d'$ about the pivot $c$ may be effected, as shown in Fig. 3, by gaining the two members where they cross each other, somewhat like the blades of shears, and forming a recess $h$ in one member which is engaged by a shoulder $i$ on the other member. Fig. 4 illustrates another limiting-stop device wherein a stud on one member plays between two shoulders $j$ on the other part; and Fig. 5 illustrates another stop device wherein a stud $d^2$ on one member plays in a slot $k$ on the other part. Any suitable or known limiting means may, however, be employed to effect the object sought. The other element, $b$, of the coupling device has a Y shape, as seen in Fig. 1, the branches $l$ of the Y having each an aperture $m$ to engage one of the hooks on the element $a$. These apertures $m$ extend into the flat shank $n$ thereof, and the end of the latter is beveled to the said apertures on both sides, as indicated in dotted lines in Fig. 1. The lateral edge or edges of the shank $n$ are beveled or thinned down, as seen at $o$, and at its extremity the shank has an eye $p$ for securing it to any part.

The coupling device, as illustrated in Figs. 6 and 7, differs from that described only in one respect. Instead of the two members $d$ and $d'$ being pivotally connected and furnished with a separate ring $g$ they are integral and bent to form a loop $q$, which performs the functions of the ring $g$. The element $a$ in these views is made from spring metal, and the hooks are held pressed together face to face by the springiness of the metal. This construction is best adapted for the smaller sizes of coupling devices.

In using the coupling device we may suppose, for example, that the element $b$ is secured to any part—as the sail of a boat, for example—by its eye $p$ and that the element $a$ is secured in like manner by its ring $g$ or eye $q$ to a rope to be attached to the sail. The operator puts the parts together, as indicated by the dotted lines in Fig. 7—that is to say, the element $a$ is presented to the beveled edge $o$ of the shank $n$ of the element $b$ in such a manner as to cause said edge to wedge apart the hooks $e\,e'$, and he then swings the elements into alinement so as to cause the hooks $e$ and $e'$ to engage, respectively, the apertures $m$ in the branches $l$. This connection of the parts may be done in an instant and by one having very little skill or practice. The disengagement of the elements may be effected by a substantial reversal of the above-described operation.

In Fig. 8 the numerals indicate the points in the rigging of a sloop or sail-boat where the coupling device may be employed advantageously.

Having thus described my invention, I claim—

1. A coupling device comprising a coupling element having two connected members each provided with an inwardly-turned hook, said hooks meeting normally face to face and adapted to be pressed or wedged apart, and a coupling element having a Y shape with apertures in its respective branches to engage the respective hooks on the other element, substantially as set forth.

2. A coupling device comprising a coupling element having two members hinged together and each provided with an inwardly-turned hook, said hooks meeting normally face to face and adapted to be pressed or wedged apart, and a coupling element having a Y shape with apertures in its respective branches to engage the respective hooks on the other element, substantially as set forth.

3. A coupling device comprising a coupling element having two connected members each provided with an inwardly-turned hook, said hooks meeting normally face to face and adapted to be pressed or wedged apart, and a coupling element having a flat, beveled shank and two branches with apertures in them to engage the respective hooks of the other element, said apertures extending into the shank, substantially as set forth.

4. In a coupling device, the combination with the coupling element $a$, consisting of two members pivotally connected at $c$, provided with eyes $f$ and a ring engaging same, and with inwardly-turned hooks $e$ and $e'$, of the coupling element $b$, having a flat, beveled shank $n$, and two apertured branches $l$ to engage the respective hooks on the other element, substantially as set forth.

In witness whereof I have hereunto signed my name in the presence of two subscribing witnesses.

CARL FREDRIK CYRILLUS EDHOLM.

Witnesses:
ERNST SVANQVIST,
J. F. A. RUTBACH.